(12) United States Patent
Hall et al.

(10) Patent No.: US 9,568,240 B2
(45) Date of Patent: Feb. 14, 2017

(54) REFRIGERATOR APPLIANCE WITH HOT WATER DISPENSER

(71) Applicant: Electrolux Home Products, Inc., Charlotte, NC (US)

(72) Inventors: David L. Hall, Piedmont, SC (US); Nilton Carlos Bertolini, Chonburi (TH)

(73) Assignee: ELECTROLUX HOME PRODUCTS, INC., Charlotte, NC (US)

( * ) Notice: Subject to any disclaimer, the term of this patent is extended or adjusted under 35 U.S.C. 154(b) by 0 days.

(21) Appl. No.: 14/837,425

(22) Filed: Aug. 27, 2015

(65) Prior Publication Data
US 2015/0369531 A1    Dec. 24, 2015

Related U.S. Application Data

(62) Division of application No. 13/838,077, filed on Mar. 15, 2013, now Pat. No. 9,139,415.

(51) Int. Cl.
*B67D 7/80* (2010.01)
*F25D 23/12* (2006.01)
(Continued)

(52) U.S. Cl.
CPC .......... *F25D 23/126* (2013.01); *B67D 1/0895* (2013.01); *B67D 7/82* (2013.01); *F16K 31/06* (2013.01);
(Continued)

(58) Field of Classification Search
CPC .................. B67D 1/0895; B67D 7/82; B67D 2210/00099; B67D 1/0007; F25D 2400/02
(Continued)

(56) References Cited

U.S. PATENT DOCUMENTS 2,126,491 A    8/1938   McCartha
2,229,580 A    1/1941   McAdams
(Continued)

FOREIGN PATENT DOCUMENTS

EP    1 677 061    7/2006

OTHER PUBLICATIONS

International Search Report issued in Application No. PCT/US2014/023875 dated Jul. 7, 2014.
(Continued)

*Primary Examiner* — Kevin P Shaver
*Assistant Examiner* — Robert Nichols, II
(74) *Attorney, Agent, or Firm* — Pearne & Gordon LLP

(57) ABSTRACT

A refrigerator is provided, including a cabinet formed with at least one refrigerated compartment and a door pivotally mounted to the cabinet via a hollow hinge to selectively open and close at least a portion of the refrigerated compartment. A water heater is mounted on an exterior surface of the cabinet about the hollow hinge and configured to heat water supplied from the refrigerator. A hot water dispenser is positioned on the door that is configured to dispense hot water supplied from the water heater into a receiver vessel, and a hot water conduit is guided through the hollow hinge and extending from the water heater to the hot water dispenser to supply the hot water from the heater to the dispenser. A method of dispensing hot water is also provided. The method utilizes at least two distinct, user-initiated steps to permit the dispensing of hot water.

12 Claims, 5 Drawing Sheets

(51) Int. Cl.

|  |  |
|---|---|
| *B67D 7/82* | (2010.01) |
| *F25D 23/02* | (2006.01) |
| *F25D 23/04* | (2006.01) |
| *B67D 1/08* | (2006.01) |
| *F16K 31/06* | (2006.01) |
| *B67D 1/00* | (2006.01) |
| *B67D 1/12* | (2006.01) |

(52) U.S. Cl.
CPC ............ *F25D 23/028* (2013.01); *F25D 23/04* (2013.01); *F25D 23/12* (2013.01); *B67D 1/0007* (2013.01); *B67D 1/0014* (2013.01); *B67D 1/1234* (2013.01); *B67D 2210/00099* (2013.01); *B67D 2210/00118* (2013.01); *F25D 2323/024* (2013.01); *F25D 2323/122* (2013.01); *F25D 2331/806* (2013.01); *F25D 2400/02* (2013.01); *F25D 2600/02* (2013.01)

(58) Field of Classification Search
USPC .......... 222/146.1, 146.2, 146.5; 62/389–391, 62/393; 392/341, 441, 449, 465
See application file for complete search history.

(56) References Cited

U.S. PATENT DOCUMENTS

| 2,341,872 | A |  | 2/1944 | Kasold |
| 5,511,388 | A |  | 4/1996 | Taylor et al. |
| 6,101,835 | A |  | 8/2000 | Butsch et al. |
| 7,130,533 | B2 |  | 10/2006 | Kim et al. |
| 7,137,272 | B2 |  | 11/2006 | Park et al. |
| 7,207,189 | B2 |  | 4/2007 | An et al. |
| 7,757,732 | B2 |  | 7/2010 | Voglewede et al. |
| 7,793,690 | B2 |  | 9/2010 | Voglewede et al. |
| 7,814,763 | B2 |  | 10/2010 | Tavolazzi et al. |
| 8,011,537 | B2 |  | 9/2011 | Muthumani et al. |
| 8,083,104 | B2 |  | 12/2011 | Roetker et al. |
| 8,651,330 | B2 |  | 2/2014 | Krause et al. |
| 8,695,371 | B2 |  | 4/2014 | Boarman et al. |
| 2006/0144066 | A1 |  | 7/2006 | Lee et al. |
| 2007/0251261 | A1 |  | 11/2007 | Son et al. |
| 2007/0256444 | A1 |  | 11/2007 | Kim et al. |
| 2008/0110194 | A1 |  | 5/2008 | Whitaker et al. |
| 2009/0133430 | A1 |  | 5/2009 | Roetker et al. |
| 2009/0199586 | A1 |  | 8/2009 | Soysal et al. |
| 2009/0249821 | A1 |  | 10/2009 | Zentner et al. |
| 2010/0175415 | A1 |  | 7/2010 | Kim et al. |
| 2010/0252575 | A1 |  | 10/2010 | Kim et al. |
| 2010/0294804 | A1 |  | 11/2010 | Dalchau et al. |
| 2012/0248141 | A1 | * | 10/2012 | Sano ................... B67D 3/0003 222/67 |
| 2013/0108249 | A1 | * | 5/2013 | Krause .................... B67D 7/80 392/465 |
| 2014/0270725 | A1 |  | 9/2014 | Bertolini et al. |

OTHER PUBLICATIONS

Written Opinion issued in Application No. PCT/US2014/023875 dated Jul. 7, 2014.

* cited by examiner

REFRIGERATOR APPLIANCE WITH HOT WATER DISPENSER

CROSS-REFERENCE TO RELATED APPLICATIONS

This application is a divisional of U.S. application Ser. No. 13/838,077, filed on Mar. 15, 2013. This application is incorporated herein by reference.

FIELD OF THE INVENTION

The present application relates generally to refrigeration appliances, and in particular to dispensing units associated with refrigeration appliances.

BACKGROUND OF THE INVENTION

Modern refrigeration appliances, such as household refrigerators for example, often include as one of their features a dispenser for dispensing content, the content typically being water and/or ice. Frequently, the dispenser is located within a recess in the exterior surface of a door of the appliance. The refrigeration appliance can take any one of a number of forms. For example, the refrigeration appliance can have freezer and fresh food compartments that are arranged side-by-side, the freezer compartment can be located above the fresh food compartment, or the freezer can be located below the fresh food compartment. In any case, separate doors can be provided for the freezer and fresh food compartments and a dispenser can be located within the recess in the exterior of at least one of the doors.

Conventionally, the dispenser can include at least an outlet for dispensing water and an outlet for dispensing ice. Associated with the water dispensing outlet can be a lever in the form of a cradle or other actuating device that is pivotally attached to the dispenser. In addition to a lever, the actuating device could also be used with other types of vessel detection such as optical, visual, or ultrasonic, etc. When water is to be dispensed, a receiver vessel, usually in the form of a beverage glass, is pressed against the lever thereby operating a switch or sensor so as to complete an electrical circuit between a source of electrical power and a solenoid-operated valve connected to a source of water. The completion of the electrical circuit opens the solenoid-operated valve (or even other types of valves, such as motor actuated valves, etc.) permitting the water to flow from the source of water to the water dispensing outlet.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the present application, a refrigerator is provided, comprising a cabinet formed with at least one refrigerated compartment and a door pivotally mounted to the cabinet via a hollow hinge to selectively open and close at least a portion of the refrigerated compartment. A water heater is mounted on an exterior surface of the cabinet about the hollow hinge and configured to heat water supplied from the refrigerator. A hot water dispenser is positioned on the door that is configured to dispense hot water supplied from the water heater into a receiver vessel, and a hot water conduit is guided through the hollow hinge and extending from the water heater to the hot water dispenser to supply the hot water from the heater to the dispenser.

In accordance with another aspect of the present application, a method of dispensing hot water from a dispenser positioned on a door of an appliance is provided. The method comprises the steps of actuating a hot water activation switch configured to selectively operate the hot water heater, and operating a water heating element to heat water supplied from the appliance, after the hot water activation switch is actuated. The method further comprises the steps of actuating a hot water dispensing switch configured to selectively dispense hot water, and dispensing hot water supplied from the water heater via the dispenser nozzle and into a receiver vessel, after the hot water dispensing switch is actuated.

It is to be understood that both the foregoing general description and the following detailed description present example and explanatory embodiments of the invention, and are intended to provide an overview or framework for understanding the nature and character of the invention as it is claimed. The accompanying drawings are included to provide a further understanding of the invention and are incorporated into and constitute a part of this specification. The drawings illustrate various example embodiments of the invention, and together with the description, serve to explain the principles and operations of the invention.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF EXAMPLE EMBODIMENTS

Figure 1:
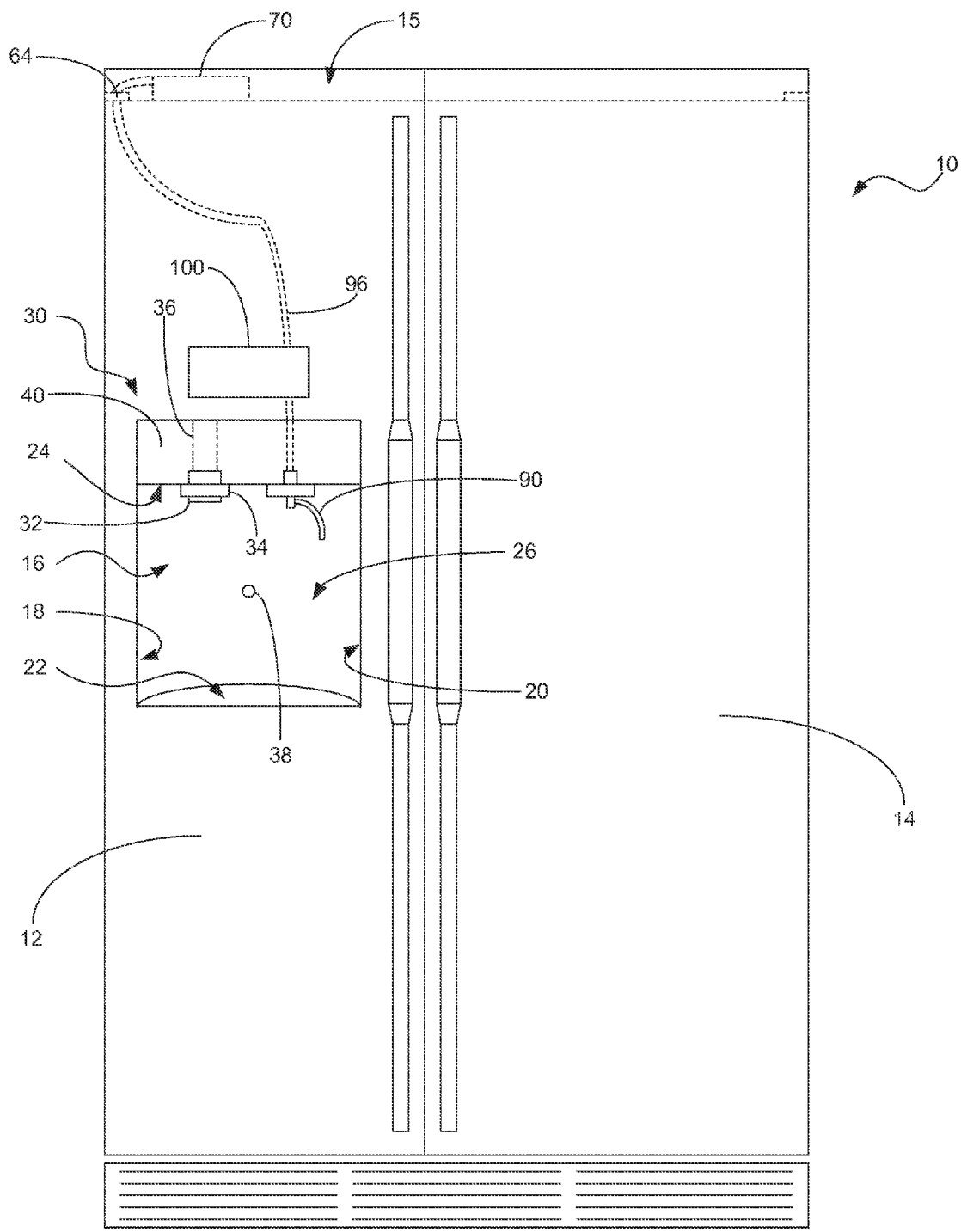
FIG. 1 is a schematic front elevation view of a refrigeration appliance illustrating one example dispensing unit.

Example embodiments that incorporate one or more aspects of the present application are described and illustrated in the drawings. These illustrated examples are not intended to be a limitation on the present application. For example, one or more aspects of the present application can be utilized in other embodiments and even other types of devices. Moreover, certain terminology is used herein for convenience only and is not to be taken as a limitation on the present application. Still further, in the drawings, the same reference numerals are employed for designating the same elements.

Turning to the shown example of FIG. 1, a refrigeration appliance in the form of a refrigerator 10 is illustrated as a side-by-side refrigerator with freezer and fresh food compartments. Conventional refrigeration appliances, such as domestic refrigerators, typically have both a fresh food compartment and a freezer compartment or section. The fresh food compartment is where food items such as fruits, vegetables, and beverages are stored and the freezer compartment is where food items that are to be kept in a frozen condition are stored. The refrigerators are provided with a refrigeration system that maintains the fresh food compartment at temperatures above 0° C. and the freezer compartments at temperatures below 0° C. While the present application is described herein by way of an example refrigeration appliance, it is contemplated that various other appliances could also be used, such as stoves, dishwashers, microwaves, stand-alone refrigerators, freezers, or ice-makers, etc.

The arrangement of the fresh food and freezer compartments with respect to one another in such refrigerators vary. For example, in some cases, the freezer compartment is located above the fresh food compartment (i.e., a top mount refrigerator), and in other cases the freezer compartment is located below the fresh food compartment (i.e. a bottom mount refrigerator). Additionally, many modern refrigerators have their freezer compartments and fresh food compartments arranged in a side-by-side relationship. Whatever arrangement of the freezer compartment and the fresh food compartment is employed, typically, separate access doors are provided for the refrigerated compartments so that either compartment may be accessed without exposing the other compartment to the ambient air. For example, a door 12 provides access to the freezer compartment, and a door 14 provides access to the fresh food compartment of the refrigerator. Both of the doors are pivotally coupled to a cabinet of the refrigerator 10 to restrict and grant access to the fresh food and freezer compartments. While the present application is described herein by way of an example side-by-side refrigerator configuration, it is contemplated that any refrigerator configuration can be used, such as top-mount or bottom-mount refrigerators having at least one door.

Located generally centrally at the surface or exterior of the door 12 is an example dispenser indicated generally at 30. It is understood that dispenser 30 could also be located at various locations on the refrigerator cabinet, refrigerator door or even inside the refrigerator. As can best be seen in FIG. 1, the dispenser 30 is located in a recess 16 in the door 12. The recess comprises side walls or surfaces 18 and 20 that are opposite one another, a bottom or lower wall or surface 22, an upper or top wall or surface 24 and a back or rear wall or surface 26. A water dispensing outlet 32 for dispensing cold water and an ice dispensing outlet 34 for dispensing ice are located at the upper surface 24 of the recess 16. In the shown embodiment of FIG. 1, the dispenser 30 can include a single dispensing outlet for the water 32 and ice 34 arranged so as to substantially coincide with one another at the upper surface 24 of the recess 16. However, in an alternative embodiment (not shown), a single dispensing outlet for water 32 and a single dispensing outlet for ice 34 can be arranged so as to be spaced apart from one another at the upper surface 24 of the recess 16 across the width of the access door 12 and not coincide with each other. The bottom surface 22 of the recess 16 can include a trough and/or drain for containing and/or draining away excess water from the water dispensing outlet 32 and/or water formed from melting ice from the ice dispensing outlet 34 that comes to rest on the bottom surface 22.

Figure 2:
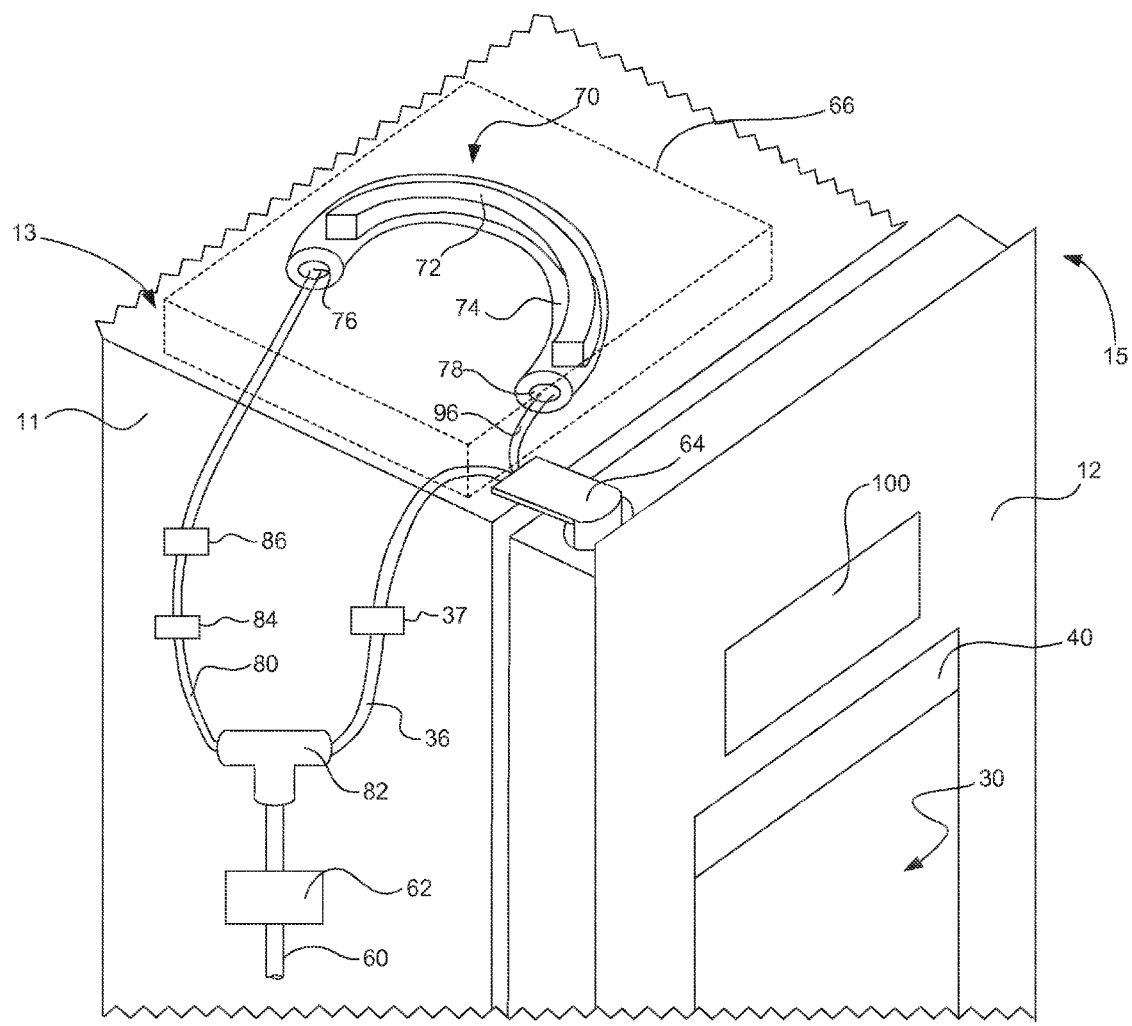
FIG. 2 is a schematic partial perspective view of a refrigerator illustrating one example location of an example water heater.

Turning briefly to FIG. 2, at least one water line 36 extends from the water dispensing outlet 32 to a water source 60. The water source 60 can be, for example the household water supply, a water reservoir within the refrigerator or connected to the household water supply, or such other sources as are familiar to those having ordinary skill in the art. Additionally, at least one water filter 62 can be located in fluid communication with the at least one water line 36 to purify the incoming water. The water filter 62 can be disposed in various locations, such as inside or outside of the refrigerator 10, or even inside the door 12. A solenoid-operated valve 37 can be located in fluid communication with the water line 36 and can be controlled by control unit that can include a microprocessor, for example as discussed below. Though described as a solenoid-operated valve, other types of valves can be used, such as motor actuated valves or the like.

The ice dispensing outlet 34 includes essentially an opening in the upper surface 24 of the recess 16. The opening is in communication with a source of ice such as, for example, the ice storage bin of an ice making unit (not shown) located in the fresh food or freezer compartment of the refrigerator. Typically, as is familiar to those of ordinary skill in the art, the ice is delivered from the ice storage bin to the ice dispensing outlet 34 by an auger which upon activation rotates so as to drive the ice from the storage bin to the ice dispensing outlet 34. Activation of the auger can be accomplished by the control unit that also controls the operation of a solenoid-operated valve located in the water line 36, or by other control structure.

At least one switch 38 can be electronically coupled to the control unit and be configured to dispense either or both of water from the water dispensing outlet 32 and ice from the ice dispensing outlet 34. Alternatively, separate switches (not shown) can be provided for each of the water dispensing outlet 32 and the ice dispensing outlet 34. The at least one switch 38 can be a contact-style switch, or can alternatively be non-contact style switch, including other types of vessel detection such as optical, visual, or ultrasonic, etc. In addition or alternatively, at least these functions can be controlled by the microprocessor, which can be appropriately programmed using information that is input by a user to a user interface 40 that is electrically connected to the microprocessor. The user interface 40 includes various control features, such as cold water, crushed or cubed ice, child lockout, lighting, etc. Thus, when a receiver vessel such as a glass is inserted within the recess 16 and the switch 38 is activated, water and/or ice can be dispensed on-demand into the receiver vessel.

The water line 36 can be provided to the water dispensing outlet 32 in the door 12 in various manners. In one example, the water line 36 can be provided to an aperture of the door 12 at various locations using via a flexible line that is of sufficient length and flexibility to accommodate the pivoting action of the door 12 as it is selectively opened and closed. In another example, the door 12 can be pivotally mounted to the cabinet 11 via a hollow hinge 64 to selectively open and close at least a portion of the refrigerated compartment. The hollow hinge 64 can provide the dual purpose of enabling the door 12 to pivot, while also providing an aperture therethrough to receive the water line 36. For example, the hollow hinge 64 can include a hollow hinge pin or the like, although various other hinges are considered. Moreover, although the hollow hinge 64 is shown located towards a top surface of the door 12, it is contemplated that the hollow hinge 64 could similarly be disposed towards the middle or bottom of the door 12. Thus, the water line 36 can pass through the hollow hinge 64, into an interior of the door 12, and to the water dispensing outlet 32 of the dispenser 30.

Keeping with FIGS. 1-2, the appliance can further be configured to dispense hot water upon request. Preferably, the appliance can dispense hot water "instantly," meaning on demand in a relatively short amount of time without having to maintain a reservoir of hot water. In one example configuration, a water heater 70 is mounted on an exterior surface of the cabinet 11 and is configured to heat water supplied from the refrigerator, such as from the water source 60. The in-line water heater 70 can heat water on demand, thus, the refrigerator 10 generally does not store water and no separate hot water tank is used for storing hot water therein to improve space utilization efficiency of the refrigerator 10 and decrease heat insulation concerns. While an in-line style heater is described herein, it is contemplated that various other heater types and configurations could be used, such as a cartridge-style heater or the like.

The water heater 70 can be located variously about exterior surfaces of the cabinet 11, such as towards the top, side, bottom, or rear, surfaces or even in the machine room. In one example, as shown, the water heater 70 can be disposed on a top exterior surface 13 of the cabinet 11. The water heater 70 may be located generally about the hollow hinge 64, such as located variously about the exterior surfaces of the cabinet 11 (e.g., the top exterior surface 13 is shown) and spaced at various distances from the hollow hinge 64, or could even in contact with the hollow hinge 64. Thus, heat generated by operation of the water heater 70 is dissipated generally upwards into the ambient environment and away from the refrigerated compartments. Optionally, a protective cover 66 is arranged over the water heater 70 to protect the heater against user contact, moisture and/or dust. The protective cover 66 is preferably made of a temperature resistant material, such as plastic or metal, and may include holes or grooves to facilitate passive heat dissipation. The protective cover 66 is preferably removable to permit service, and/or provides at least one removable service panel. The protective cover 66 may also provide a visual cover to hide the water heater 70 and associated elements from view, such as from a user standing in front of the refrigerator 10. The protective cover 66 may be separate from a hinge cover (not shown) provided over the door hinge, or may be coupled to or formed with such a hinge cover. In addition or alternatively, an upper portion 15 of the refrigerator door 12 may extend upwards to partially or completely obscure the hinge 64, water heater 70, and/or protective cover 66 from view. An insulated shielding layer (not shown) can be positioned between the water heater 70 and the top exterior surface 13 of the cabinet 11 to inhibit undesired heat from entering into the refrigerated compartment.

Figure 3:
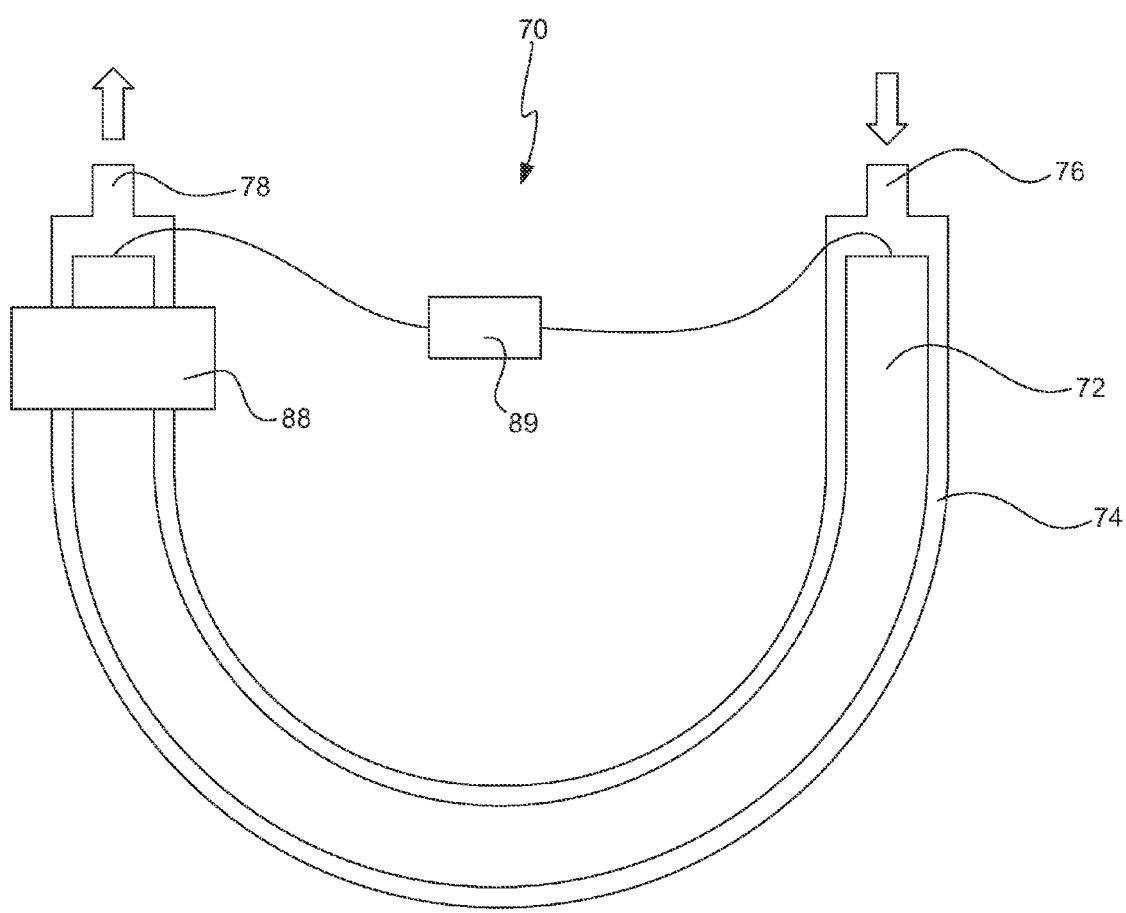
FIG. 3 is detail view of the example water heater of FIG. 2.

With reference to FIG. 3, a detail view illustrates one example water heater 70 that includes an in-line style heater, with a heating element 72 coupled to a water channel 74 to provide close contact with the water flowing therethrough. The in-line style heater generates heat through the application of electric power thereto to heat the water flowing through water channel 74 to a predetermined temperature. The close contact with the water provides for efficient heating with less power consumption compared to an external heater because there is less loss of heat generated from the heater. It is contemplated that the heating element 72 can directly contact and heat the water, or as shown, can indirectly contact via the water channel 74 to heat the water. The water channel 74 can be made of various materials having a relatively high thermally conductivity (e.g., metal, such as aluminum, copper, steel, etc.). While the illustrated example in-line style heater is described as an example, it is understood that various other types of water heaters having various configurations can also be used without departing from the scope of the present application.

In the shown example, the heating element 72 can extend along at least partially, such as substantially all of, a length of the water channel 74 to thereby heat the water flowing through the water channel 74. It is contemplated that the heating element 72 can follow along or even wrap about the water channel 74, or vice-versa, such as with a coiled water channel about a cartridge heater or the like. Additionally, although shown as a semi-circular configuration, it is contemplated that the heating element 72 and/or water channel 74 can have various geometries. Preferably, the heating element 72 and water channel 74 are configured to heat the water quickly and on demand, with no separate hot water tank for storing hot water, or for retaining much, if any, residual water after the water heating process is complete.

Water from the water source 60 can enter the water channel 74 via an input 76, where it is heated by flowing through the water channel 74 and along the heating element 72, and then exit the water channel 74 via an outlet 78. Water flows from the water source 60 through a water inlet line 80 to the water inlet 76 of the water channel 74. The water inlet line 80 can be the same or different from the water line 36 for the cold water dispenser outlet 32. For example, as shown in FIG. 2, the water inlet line 80 for the water heater 70 can be independent from the water line 36 by a manifold 82, which can be a "T"-junction or the like. Where a manifold 82 is used, it can be beneficial to provide a water filter 62 upstream of the manifold 82 so that a single filter can be used to purify water for both of the water dispenser outlet 32 and water heater 70 (and possibly other water-using devices, such as an ice maker), although it is contemplated that a plurality of water filters (not shown) can be used for each independent water line to independently purify the different water streams. In another embodiment (not shown), the water inlet line 80 can extend directly from the water source 60 to the water heater 70.

Additionally, a solenoid-operated valve 84 can be located in fluid communication with the water line 80 and can be controlled by the control unit and/or microprocessor. Though described as a solenoid-operated valve, other types of valves can be used, such as motor actuated valves or the like. Operation of the valve 84 selectively permits the flow of water through the water heater 70. In addition or alternatively, as will be discussed below, the valve 84 can also regulate the flow of water through the water heater 70. An optional water flow meter 86 can also be installed on the water inlet line 80 (before or after the water heater 70) and downstream of the valve 84. The water flow meter 86 is configured to measure an amount of water flowing through the water heater 70, such as a water flow rate (volumetric flow or mass flow), or even a quantity of water (volumetric or mass) that has passed through the water heater 70. The water flow meter 86 may operate together with the control unit and/or microprocessor, may be coupled to or part of the valve 84, or may even operate independently. In one example, the valve 84 (with or without the water flow meter 86) can selectively restrict the water flow rate to be no more than a predetermined amount, such as 7 oz/30 sec, although various flow rates are contemplated. In another example, an independent adjustable or non-adjustable flow regulator could be separate from the valve 84 and placed in-line to restrict the water flow rate to be no more than a predetermined amount. It is further contemplated that the water flow meter 86 may also be used as a safety device to permit operation of the water heating element 72 only when water is sensed to be flowing through the hot water channel 74, and may otherwise directly or indirectly inhibit operation of the heating element 72. While only one valve 84 is shown, it is contemplated that at least one more valve could be utilized near the dispenser 30 to inhibit after-flow of hot water after a dispensing operation is complete.

In addition or alternatively, at least one temperature sensor 88 can be associated with the water heater 70 to measure the temperature of the heated water. In one example, the temperature sensor 88 can be attached to the water channel 74 to measure the temperature of the water in the hot water channel 74 being heated by the heating element 72. It is contemplated that the temperature sensor 88 can directly contact the water, or can indirectly contact the water (as shown) via the water channel 74 to measure the water temperature. Alternatively, the temperature sensor 88 can be located downstream of the water channel 74, such as in-line with the water outlet 78. Various types of temperature sensors can be used, such as thermistors or thermocouples, or others as known in the art. The temperature sensor 88 can indirectly or directly control operation of the heating element 72 and/or valve 84, and can be operatively coupled to the control unit and/or microprocessor, or may even be coupled to or part of the valve 84, or may even operate independently. Based on the measured water temperature, the heating element 72 and/or valve 84 can be selectively operated, such as to increase or decrease the amount of heat applied to the water and/or the water flow rate. In addition or alternatively, upon initial operation of the water heater 70, the water flow can be reduced or even stopped by the valve 84 until heating element 72 and/or water within the water channel 74 reaches a predetermined operating temperature sensed by the temperature sensor 88.

In addition or alternatively, more than one temperature sensor can be utilized, such as a temperature sensor to measure the incoming water temperature, and/or even the temperature of the water ultimately dispensed to a user. For example, the control unit or microprocessor can take into account temperature difference(s) among any or all of the water source temperature, the measured value of the water being heated by the heater, and the final temperature ultimately dispensed to a user, and vary the operation of the heating element 72 and/or valve 84. In addition or alternatively, an overload sensor 89 can be operatively coupled to the water heater 70 to provide overload protection during operation. The overload sensor 89 can sense temperature and/or electrical load (voltage, current, resistance, etc.) during operation of the heating element 72, and if the sensed value exceeds a predetermined amount, can directly or indirectly stop operation of the heating element 72. For example, if the heating element 72 exceeds a predetermined maximum temperature, and/or exceeds a predetermined maximum electrical load, the overload sensor 89 can stop operation of the heating element 72 directly, such as acting like a fuse or circuit breaker, or can even function indirectly via the control unit or microprocessor.

A hot water dispenser 90 is positioned on the door 12 that is configured to dispense hot water supplied from the water heater 70 into a receiver vessel 92. The hot water dispenser 90 includes a dispenser nozzle 94 for dispensing the hot water into the receiver vessel 92. The hot water dispenser nozzle 94 is located within the dispenser 30 and is spaced apart from the cold water dispenser outlet 32 and ice dispensing outlet 34. A hot water conduit 96 extends from the water heater 70 to the hot water dispenser 90 to supply the hot water from the water heater 70 to the dispenser nozzle 94. The hot water conduit 96 is coupled to the hot water outlet 78 of the water channel 74, and is guided through the hollow hinge 64 to extend through the interior of the door 12 and to the hot water dispenser nozzle 94. Depending upon where the water heater 70 is spaced about the hollow hinge 64, the hot water conduit 96 could include an insulated jacket or the like if the water heater 70 is spaced a relatively large distance from the hollow hinge 64. The hot water conduit 96 can be captured in the door foam or even in its own channel. The hot water conduit 96 is made of a material capable of withstanding the hot water temperatures, and may be an insulated line. Additionally, the hot water conduit 96 can extend through the same hollow hinge 64 as the cold water line 36, and could be arranged in close proximity. Optional separating structure may be provided to keep the two lines spaced apart. For example, either or both line could include insulation, and/or the hollow hinge 64 could be provided with separate apertures (not shown) or even a separating wall (not shown) within a common aperture.

Figure 4:
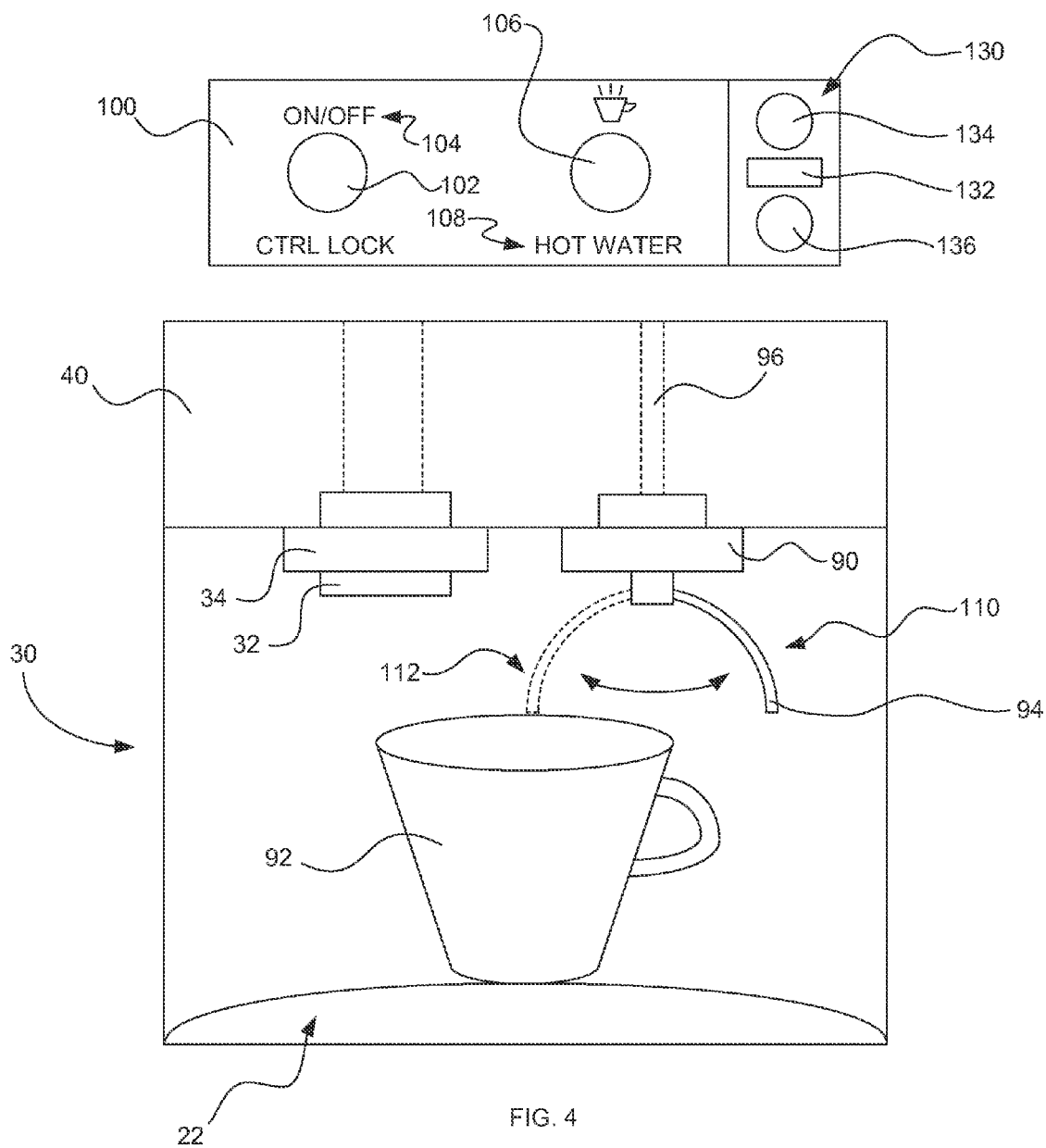
FIG. 4 is an enlarged detail view of an example dispensing unit and user interface.

In an effort to reduce the possibility of inadvertent hot water dispensing, an example method of dispensing hot water utilizes at least two distinct, user-initiated steps to permit the dispensing of hot water. Turning now to FIGS. 4-5B, a hot water user interface 100 can be provided to present various controls to the user. Although shown as an independent interface, it is understood that the hot water user interface 100 could also be a part of the ice and water dispenser user interface 40 or even part of another appliance user interface. However, it can be beneficial for the entire hot water dispensing system to be separate from the electronic controls of the refrigerator 10. Generally, the shown example hot water user interface 100 includes a hot water activation switch 102 to selectively operate the hot water heater 70. Operation of the hot water activation switch 102 by the user can selectively turn the hot water dispensing system on and off, and may include an alert, such as illuminated visual indicia 104 or an audible sound, to indicate whether the hot water dispensing system is active or inactive. When active, hot water can be dispensed upon actuation of at least one additional switch the user, while hot water dispensing is prevented when the system is in an inactive state. It is understood that as used herein, the term "actuating" refers to changing state (e.g., changing a state of a switch from on to off or vice-versa, or some intermediate condition over a range).

In a further example, the hot water user interface 100 can include a hot water dispensing switch 106 configured to selectively control dispensing of the hot water from the dispenser nozzle 94. Operation of the hot water dispensing switch 106 by the user can selectively cause water to flow through the water heater 70, such as by operating the water valve 84. Operation of the hot water dispensing switch 106 by the user may also cause the water heating element 72 to operate and thereby heat the water. An alert, such as illuminated visual indicia 108 or an audible sound can be provided to indicate whether hot water is actively being dispensed by the system.

It is further contemplated that the dispensing of the hot water may be permitted only when the user is actuating one or more of the switches. For example, the user can actively actuate both of the hot water activation switch 102 and the hot water dispensing switch 106 to permit dispensing, and the system will stop dispensing if either switch is released. Actuating the hot water activation switch 102 can selectively operate the hot water heater 70, including operating the water heating element 72 to heat the water after the hot water activation switch 102 is actuated. Then, actuating the hot water dispensing switch 106 can selectively dispense hot water supplied from the water heater 70 via the dispenser nozzle 94 and into the receiver vessel 92, after the hot water dispensing switch 106 is actuated. In another example, the hot water activation switch 102 may be actuated once, but the dispensing of hot water is permitted only when the hot water dispensing switch 106 is actively actuated. The hot water dispensing will subsequently stop once the user releases the hot water dispensing switch 106. In another example, the system can stop dispensing if the hot water activation switch 102 is pressed again to deactivate the system. Such methods utilize at least two distinct, user-initiated steps to permit the dispensing of hot water.

In yet another example, the hot water dispenser nozzle 94 can be selectively movable between at least a first position 110 and a second position 112. The first position 110 is a non-dispensing position, in which dispensing of hot water is inhibited, and the second position 112 is a dispensing position, in which dispensing of hot water is permitted. Active movement of the dispenser nozzle 94 between the first and second positions 110, 112, in combination with either or both of hot water activation switch 102 and the hot water dispensing switch 106, can provide a second (or third) distinct, user-initiated step to permit the dispensing of hot water. The dispenser nozzle 94 can be selectively movable between the first and second positions 110, 112 in various manners. For example, the dispenser nozzle 94 can slide or translate along one or more axes, such as left/right, front/back, and/or up/down. In another example, the dispenser nozzle 94 can be configured to rotate between the first and second positions 110, 112. As shown in FIG. 4, the dispenser nozzle 94 can rotate generally left and right (or vice-versa), although it is contemplated that the dispenser nozzle 94 can rotate along one or more axes. It is further contemplated that the dispenser nozzle 94 can move in a straight path, angled path, curved path, and/or using various slide and rotate combinations of the above-described movements.

Figure 5A:
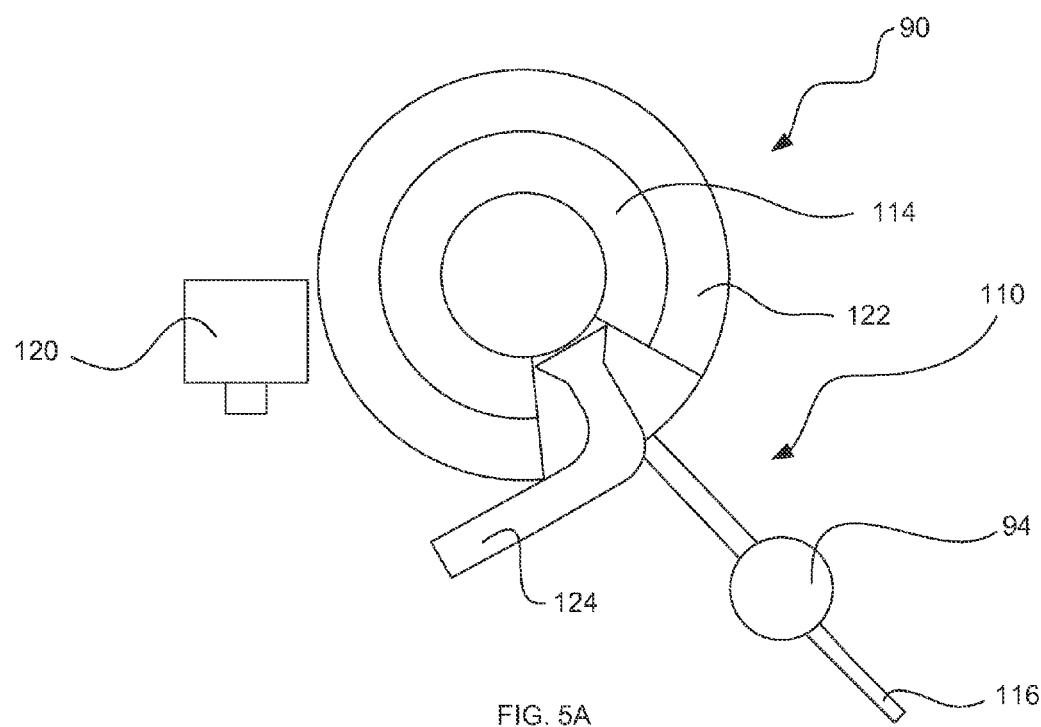
FIGS. 5A-5B are two detail views of an example dispensing nozzle in different positions.
Figure 5B:
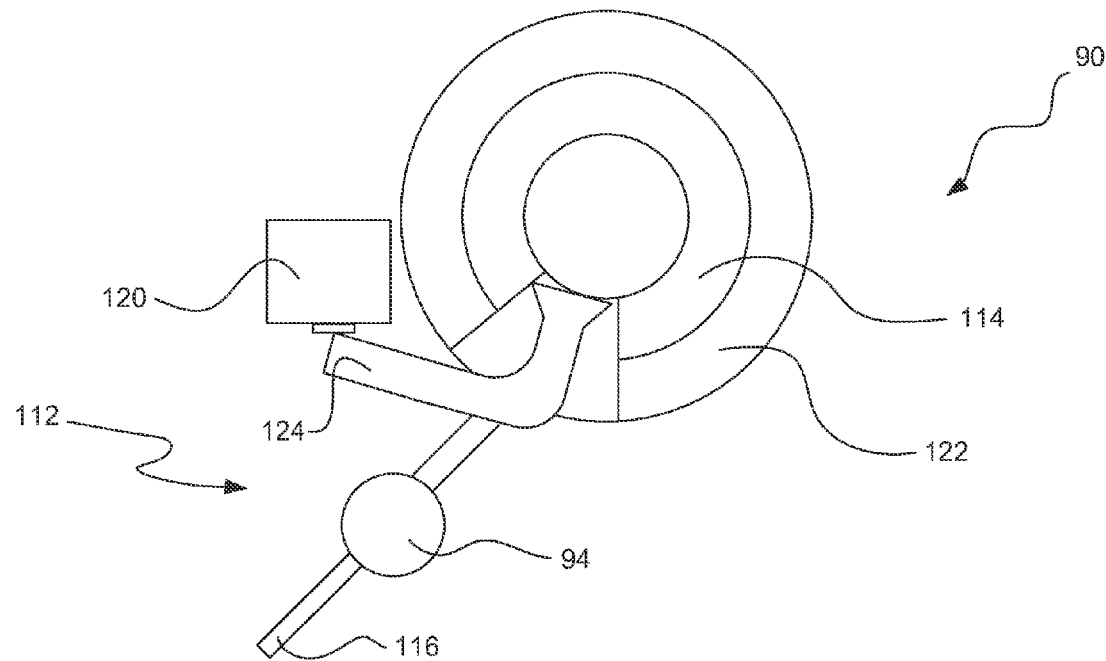

Turning briefly to FIGS. 5A-5B, which are schematic diagrams of the hot water dispenser 90, the dispenser nozzle 94 can be biased towards the first, non-dispensing position 110. A resilient biasing member 114 (shown schematically in FIGS. 5A-5B), such as a spring or the like, can bias the dispenser nozzle 94 towards the first position 110. A handle 116 or similar structure can be provided to facilitate movement of the dispenser nozzle 94. It is further contemplated that movement of the dispenser nozzle 94 can be performed manually, or even automatically such as by a user-initiated motorized mechanism. Thus, inadvertent dispensing is inhibited, and the user initiates an active step to permit the dispensing of hot water. Additionally, at least one nozzle switch 120 is configured to be actuated when the dispensing nozzle is moved to a selected one of the first position 110 and the second position 112. As shown, the nozzle switch 120 is actuated when the dispenser nozzle 94 is moved to the second position 112, although it is contemplated that a nozzle switch could be actuated when the dispenser nozzle 94 is moved away from the first position 110. It is also contemplated that multiple switches could be used at both of the first and second positions 110, 112. A carrier 122 is operatively coupled to the dispenser nozzle 94 and is movable therewith, and carries a projection 124 or similar structure for actuating the nozzle switch 120. For example, FIG. 5A shows the hot water dispenser 90 with the dispenser nozzle 94 in the first, non-dispensing position and the nozzle switch 120 in a non-actuated condition. Next, FIG. 5B shows the hot water dispenser 90 with the dispenser nozzle 94 rotated to the second, dispensing position. The carrier 122 has rotated together with the dispenser nozzle 94, causing the projection 124 to engage the nozzle switch 120 so that it is in an actuated condition. In other examples, the carrier 122 could be configured as a cam with an associated cam projection configured to actuate the nozzle switch 120 upon movement, such as rotation, of the carrier 122. It is understood that the illustrations of FIGS. 5A-5B are schematic and show only one example construction and movement of the dispenser nozzle 94 and carrier 122, and that various other constructions and movements are contemplated.

Example methods of dispensing hot water from the hot water dispenser 90 will be described. In one example, the method includes the steps actuating a hot water activation switch 102, and actuating a hot water dispensing switch 106, to selectively operate the hot water heater 70. Next, the water heating element 74 is operated to heat water supplied from the appliance. Finally, hot water supplied from the water heater 70 is dispensed from the dispenser nozzle 94 and into the receiver vessel 92.

In another example, the method includes the steps of moving the dispenser nozzle 94 from a first, non-dispensing position 110 to a second, dispensing position 112. A hot water activation switch 102 is actuated to selectively operate the hot water heater 70. Next, the water heating element 74 is operated to heat water supplied from the appliance after the dispenser nozzle 94 has moved to the second, dispensing position 112 and the hot water activation switch 102 is actuated. Finally, hot water supplied from the water heater 70 is dispensed from the dispenser nozzle 94 and into the receiver vessel 92.

The method can further include the step of actuating a hot water dispensing switch 106, such that the step of dispensing hot water occurs only while the hot water dispensing switch 106 is actuated. Thus, the hot water activation switch 102 and movement of the dispenser nozzle 94 could be considered precursor steps, and dispensing of the hot water occurs only while the hot water dispensing switch 106 is actively pressed. Alternatively, the step of dispensing hot water can occur for a predetermined amount of time (which can be preprogrammed, adjustable, and/or dependent upon the size or type of beverage) after the hot water dispensing switch 106 is actuated, without needing to keep the button pressed. In another example, dispensing hot water can occur only when the hot water activation switch 102 is actuated prior to the hot water dispensing switch 106, such that the hot water activation switch 102 can act as a system lock out. It is contemplated that the operation of the switches 102, 106, 120 can be operated in a specific order (e.g., 102 then 120 then 106, or 120 then 102 then 106, etc.) for the hot water system to function, or even in out-of-order sequences. In addition or alternatively, the hot water activation switch 102 could also provide the function of a child lock that prevents operation of the water heater 70, such as by deactivating the system when the activation switch 102 is pressed and held for a predetermined amount of time (and unlocked in a similar manner). A visual or audible alert can indicate lock status. At the end of the hot water dispensing cycle, little, if any, water remains in the hot water system. The total hot water dispensing operation can be relatively quick, such as less than about one minute. For example, the dispensing operation could last for about 45 seconds, including about 7-8 seconds for warm-up, 30 seconds for dispensing, and about 7-8 seconds for finalization and termination.

In addition or alternatively, the method can include time as a variable for operation of the hot water system. Time between actions can be measured variously, such as by the control unit or microprocessor, or even independently. Thus, the hot water dispensing system can be deactivated unless two or more buttons are pressed by a user within a predetermined amount of time, such as two to ten seconds (or other time), which can inhibit inadvertent dispensing of hot water. In one example, the method can include the step of measuring a period of time between actuation of the hot water activation switch 102 and actuation of the hot water dispensing switch 106, and hot water can be dispensed only when the measured period of time is less than a predetermined time limit (which can be fixed or adjustable). In another example, the method can include the step of measuring a period of time between the actuation of the hot water activation switch 102 and actuation of the nozzle switch 120 via movement of the dispensing nozzle 94, and hot water can be dispensed only when the measured period of time is less than a predetermined time limit. It is contemplated that the above time-measured steps can be combined in various orders. It is further contemplated that the step of measuring a period of time between different switch actuations can be done in multiple stages, such as measuring a first period of time between two button presses (e.g., between 102 and 120), and also a second period of time between two button presses (e.g., between 120 and 106), and may dispense hot water only if both measured time periods are less than predetermined time limits. It is further contemplated that the step of measuring a period of time between the switch actuations can be done in an overall total elapsed time, such as measuring a total elapsed time period of time between a first button press and a final button press, regardless of intermediate button presses, such as (e.g., between 102 and 106), and may dispense hot water only if total elapsed time period is less than predetermined total time limits. Various combinations of the above can be used. It is further contemplated that one or more predetermined time limits can be used, which can be similar or different.

In addition or alternatively, the method can include an amount of water dispensed as a variable for operation of the hot water system. The amount of dispensed water can be measured variously using the control unit or microprocessor, such as by the water flow meter 86 or even by dispensing time. Thus, the hot water dispensing system can be deactivated once a predetermined amount of hot water is dispensed by the system to inhibit inadvertent over-dispensing of hot water. In one example, the method can include the step of measuring an amount (volume or mass) of water dispensed from the dispenser nozzle 94 and into the receiver vessel 92, and stopping the dispensing of hot water once the measured amount of water is equal to or greater than a predetermined dispensing amount limit. In another example, the method can include an indirect measurement of the dispensed amount by measuring a period of dispensing time when hot water is being dispensed from the dispenser nozzle 94 and into the receiver vessel 92, and stopping the dispensing of hot water once the measured dispensing time is equal to or greater than a predetermined dispensing time limit. In one example, the indirect measurement can be determined by multiplying the dispensing time by a known or estimated water volume or mass flow rate.

In addition or alternatively, the above dispensing system can be configured to selectively adjust the temperature of the hot water dispensed into the receiver vessel 92. For example, the average drinking temperature for instant drinks is approximately 140° F. In one embodiment, 140° F. can be set as a default temperature for hot water output. However, research has shown that a temperature between approximately 180 to 185° F. is recommended as a serving temperature for instant coffee, whereas serving temperature varies for tea products, with recommended values to be about 150° F. for green tea, about 165° F. for white tea, about 180° F. for oolong and about 190° F. for black tea.

The hot water user interface 100 can further include a temperature selection interface 130 that can include a display 132 and/or various buttons, such as a temperature increase button 134 or temperature decrease button 136. The selective adjustment of temperature can be manual, semi-automatic, or even completely automatic. In one example, the selective temperature adjustment can be performed automatically by the control unit or microprocessor upon selection of a type of beverage by the user. Based on predetermined values, and optionally adjusted based upon sensed ambient temperature in the environment around the refrigerator 10, the control unit or microprocessor can automatically adjust the temperature of the hot water. In a semi-automatic mode, the user can select a type of beverage and then utilize the temperature increase or decrease buttons 134, 136 to adjust the temperature for personal taste. In a manual mode, the user can utilize the temperature increase or decrease buttons 134, 136 to adjust the temperature to a desired value. After determining the temperature for the hot water, the control unit or microprocessor can adjust the temperature of the dispensed hot water by adjusting operation of the heating element 72 (e.g., increase, decrease, pulse, etc.) and/or adjusting operation of the water supply valve 84 to alter the water flow through the water channel 74 (e.g., increase, decrease, pulse, etc.). It is contemplated that the user can save presets of favorite drinks, temperatures, or drink and temperature combinations. It is further contemplated that the system can reset to a default temperature each time the system is used, or may recall the last drink or temperature.

In addition or alternatively, a service mode can be provided to flush water through the hot water system (e.g., water channel 74, conduit 96, dispensing nozzle 94, etc.), with or without use of the heating element 72. For example, the service mode can operate the valve 84 without operating the heating element 72 to flush water through the hot water dispensing system for service or cleaning. In another example, the service mode can operate the valve 84 while also operating the heating element 72 at a standard or even extra-high temperature (e.g., the boiling point of water), to sanitize flush water through the hot water dispensing system for service or cleaning. The amount of flushing water can be predetermined or adjustable.

It is further contemplated that electrical lines (e.g., power, data, etc.) for any or all of the structure described herein can also be guided through the hollow hinge 64 (e.g., user interfaces 40, 100, heating element 72, valves 37, 84, sensors 86, 88, components of the dispensers 32, 34, 90, etc.).

It is understood that, in relation to sensed values, use of the word "exceeds" (and similar words/phrases) refers to sensed values that differ to greater or lesser amount as compared to a known value. Thus, a sensed value can exceed a known value by being greater than or less than the known value by a certain amount.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A method of dispensing hot water from a dispenser positioned on a door of an appliance, comprising the steps of:
first, actuating a hot water activation switch to selectively operate a hot water heater, wherein the hot water activation switch permits but does not require dispensing of hot water;
next, energizing an on-demand water heating element to heat water supplied from the appliance, after the hot water activation switch is actuated;
subsequently actuating a hot water dispensing switch to selectively dispense hot water by energizing an electrically-operated water valve to permit water flow through the water heating element;
moving a dispenser nozzle, that is configured to dispense hot water therefrom, from a first, non-dispensing position to a second, dispensing position;
actuating, in response to movement of the dispenser nozzle, an electrically operated nozzle switch, whereby the movement of the dispenser nozzle directly causes the actuation of the nozzle switch via an element carried with the dispenser nozzle; and
dispensing hot water supplied from the water heater via a dispenser nozzle and into a receiver vessel, after the hot water dispensing switch is actuated,
wherein initiating dispensing of the hot water from the dispenser nozzle is inhibited unless all of the hot water activation switch, the hot water dispensing switch, and the nozzle switch are actuated.

2. The method according to claim 1, wherein the hot water activation switch, hot water dispensing switch, and electrically-operated water valve are in operational communication with a control unit that selectively operates the electrically-operated water valve based upon input from the hot water activation switch and hot water dispensing switch.

3. The method according to claim 1, wherein the step of dispensing hot water occurs only when the hot water activation switch is actuated prior to the hot water dispensing switch.

4. The method according to claim 1, further comprising the step of measuring a period of time between actuation of the hot water activation switch and the hot water dispensing switch, wherein the step of dispensing hot water occurs only when the measured period of time is less than a predetermined time limit.

5. The method according to claim 1, further comprising the step of measuring a period of time between the actuation of the hot water activation switch and actuation of the nozzle switch, wherein the step of dispensing hot water occurs only when the measured period of time is less than a predetermined time limit.

6. The method according to claim 1, further comprising the steps of measuring a period of dispensing time when hot water is being dispensed from the dispenser nozzle and into said receiver vessel, and stopping the dispensing of hot water once the measured dispensing time is equal to or greater than a predetermined dispensing time limit.

7. The method according to claim 1, further comprising the steps of measuring an amount of water dispensed from the dispenser nozzle and into said receiver vessel, and stopping the dispensing of hot water once the measured amount of water is equal to or greater than a predetermined dispensing amount limit.

8. The method according to claim 1, wherein the on-demand water heating element heats water flowing therethrough for substantially immediate dispensing via the hot water dispenser and without the use of a separate hot water tank.

9. The method according to claim 1, wherein the electrically-operated water valve comprises a solenoid-operated valve.

10. The method according to claim 1, wherein the step of moving the dispenser nozzle includes rotating the dispenser nozzle between the first and second positions.

11. The method according to claim 1, wherein the step of moving the dispenser nozzle includes translating the dispenser nozzle between the first and second positions.

12. The method according to claim 1, wherein the dispenser nozzle is biased towards the first position.

* * * * *